(12) United States Patent
Wu et al.

(10) Patent No.: US 9,355,306 B2
(45) Date of Patent: May 31, 2016

(54) METHOD AND SYSTEM FOR RECOGNITION OF ABNORMAL BEHAVIOR

(71) Applicant: KONICA MINOLTA LABORATORY U.S.A., INC., San Mateo, CA (US)

(72) Inventors: Dongdong Wu, Milpitas, CA (US); Yongmian Zhang, Union City, CA (US); Haisong Gu, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 257 days.

(21) Appl. No.: 14/039,437

(22) Filed: Sep. 27, 2013

(65) Prior Publication Data

US 2015/0092978 A1   Apr. 2, 2015

(51) Int. Cl.
*G06K 9/42* (2006.01)
*G06K 9/00* (2006.01)

(52) U.S. Cl.
CPC .. *G06K 9/00342* (2013.01); *G06K 2009/00738* (2013.01)

(58) Field of Classification Search
None
See application file for complete search history.

(56) References Cited

U.S. PATENT DOCUMENTS

| | | | |
|---|---|---|---|
| 6,678,413 B1* | 1/2004 | Liang | A61B 5/1113 348/169 |
| 8,407,625 B2 | 3/2013 | Cohen et al. | |
| 8,631,355 B2* | 1/2014 | Murillo | A63F 13/06 715/863 |
| 2003/0058111 A1* | 3/2003 | Lee | G06K 9/00342 340/573.1 |
| 2011/0007142 A1* | 1/2011 | Perez | G06F 3/017 348/77 |
| 2012/0134532 A1 | 5/2012 | Ni et al. | |
| 2014/0244264 A1* | 8/2014 | Thirumalainambi | G06F 17/2785 704/270 |

* cited by examiner

*Primary Examiner* — Phuoc Tran
(74) *Attorney, Agent, or Firm* — Buchanan Ingersoll & Rooney PC

(57) ABSTRACT

A method for recognizing abnormal behavior is disclosed, the method includes: capturing at least one video stream of data on one or more subjects; extracting body skeleton data from the at least one video stream of data; classifying the extracted body skeleton data as normal behavior or abnormal behavior; and generating an alert, if the extracted skeleton data is classified as abnormal behavior.

17 Claims, 4 Drawing Sheets

METHOD AND SYSTEM FOR RECOGNITION OF ABNORMAL BEHAVIOR

FIELD OF THE INVENTION

The present disclosure relates to a method and system for recognition of abnormal behavior, and wherein the method and systems can be applied to monitor real-time human behavior and detection of abnormal behavior.

BACKGROUND

Abnormal behavior can refer to unusual or statistically rare behavior. For example, recognition of abnormal behavior can be used to detect if an individual has acted or behaved in a manner that suggests abnormality. For example, an individual has fallen at home or work. Abnormal behavior detection is one of the sub-topics of automatic video information searching and content analysis. Main applications of abnormal behavior detection can include, for example, safety of elders at home, and worker protection at working places.

SUMMARY

In consideration of the above issues, it would be desirable to have a method and system for recognizing abnormal behavior, which can be used for both indoor and outdoor environments, and having the ability to monitor workers and individuals in environments, which can include, for example, work, home, and/or hospitals.

In accordance with an exemplary embodiment, a method for recognizing abnormal behavior is disclosed, the method comprising: capturing at least one video stream of data on one or more subjects; extracting body skeleton data from the at least one video stream of data; classifying the extracted body skeleton data as normal behavior or abnormal behavior; and generating an alert, if the extracted skeleton data is classified as abnormal behavior.

In accordance with an exemplary embodiment, a system for recognition of abnormal behavior is disclosed, the system comprising: an online process module configured to extract behavior features from at least one video stream of data; a behavior recognition module configured to classify a current behavior shown in the at least one video stream of data as abnormal behavior or normal behavior based on extracted features from the at least one video stream of data; and an offline analysis module configured to provide a user interface for manually enrolling the abnormal behavior and managing a behavior database of the abnormal and normal behaviors.

In accordance with an exemplary embodiment, a system for recognition of abnormal behavior is disclosed, the system comprising: a video camera configured to capture at least one video stream of data on one or more subjects; and one or more modules having executable instructions for: extracting body skeleton data from the at least one video stream of data; classifying the extracted body skeleton data as normal behavior or abnormal behavior; and generating an alert, if the extracted skeleton data is classified as abnormal behavior.

In accordance with an exemplary embodiment, a non-transitory computer readable medium containing a computer program having computer readable code embodied therein for recognition of abnormal behavior, the computer readable medium comprising: capturing at least one video stream of data on one or more subjects; extracting body skeleton data from the at least one video stream of data; classifying the extracted body skeleton data as normal behavior or abnormal behavior; and generating an alert, if the extracted skeleton data is classified as abnormal behavior.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
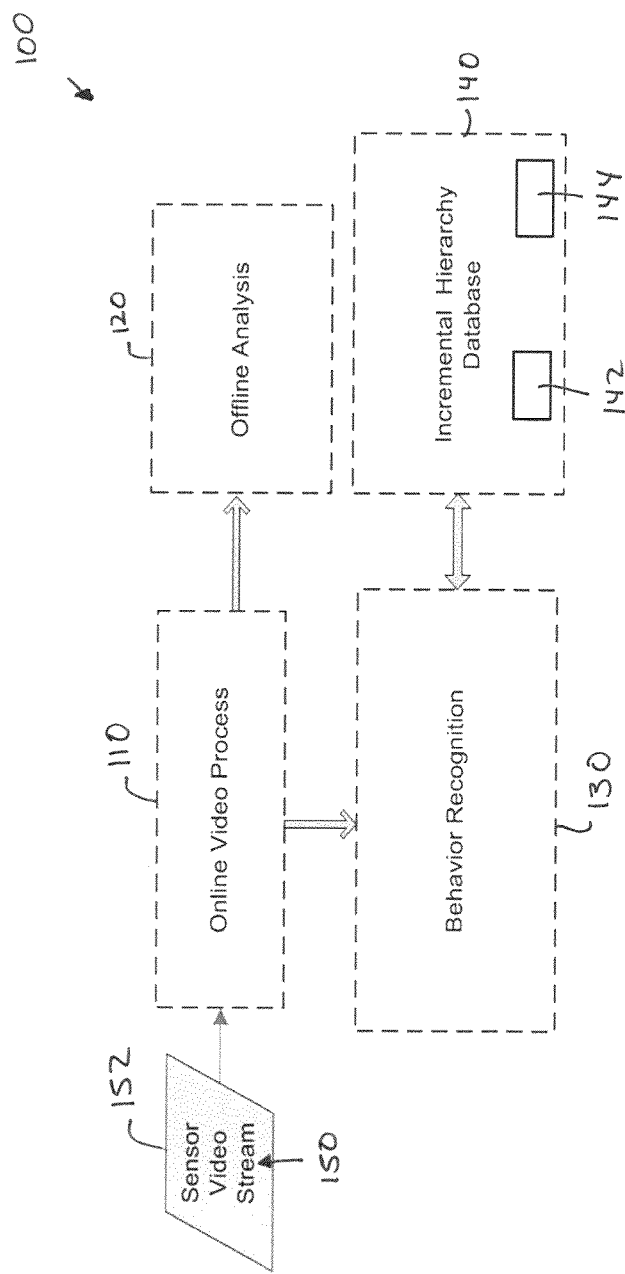
FIG. 1 illustrates a behavior recognition system in accordance with an exemplary embodiment.

Reference will now be made in detail to the embodiments of the invention, examples of which are illustrated in the accompanying drawings. Wherever possible, the same reference numbers are used in the drawings and the description to refer to the same or like parts.

In accordance with an exemplary embodiment, the present disclosure relates to a system and method for recognition of abnormal behavior. The behavior recognition system 100 can include an online process module 110, a behavior recognition module 130, an offline analysis module 120, and an incremental hierarchy database 140. The system 100 and/or each of the modules 110, 120, 130, 140 can include one or more computer or processing devices having a memory, a processor, an operating system and/or software and/or an optional graphical user interface (GUI) and/or display.

In accordance with an exemplary embodiment, the online process module 110 extracts behavior features from input raw data received from an original video stream 150 depicting one or more subjects (not shown). The original video stream 150 can be generated using one or more motion and/or depth sensors, in combination with, for example, video cameras 152 and/or other known motion and depth sensors and/or devices. For example, in accordance with an exemplary embodiment, the original video stream 150 can be received from 2D (two-dimensional) and/or 3D (three-dimensional) video camera technology. In accordance with an exemplary embodiment, the video camera 152 or detection system preferably includes a motion detector or sensor, such that the original video stream 150 is provided only upon detection of movement of the one or more subjects. In accordance with an exemplary embodiment, the one or more subjects can include human and/or animals.

Figures 4, 5:
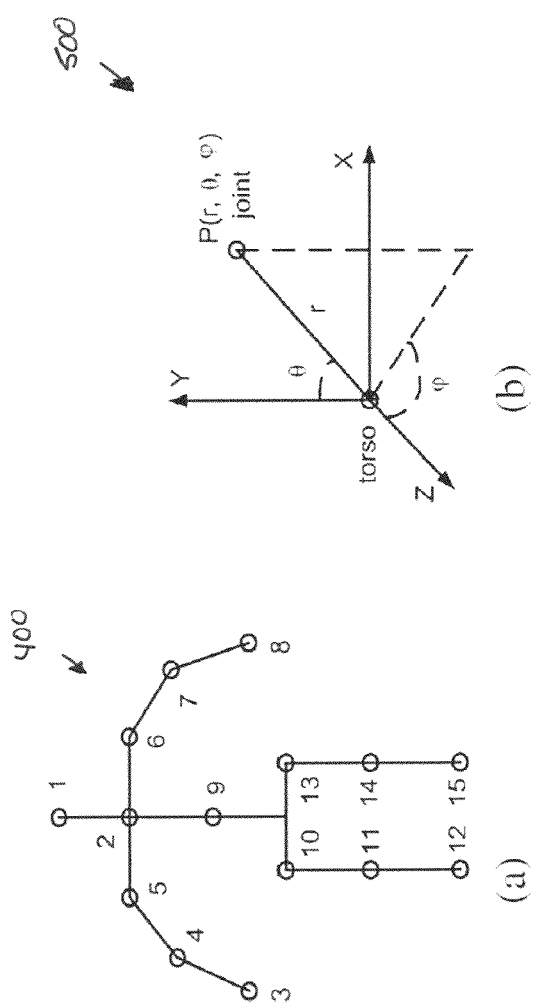
FIG. 4 illustrates a human skeleton system showing the body joints.
FIG. 5 illustrates a joint in the spherical coordinate of the human skeleton system of FIG. 4.

In accordance with an exemplary embodiment, the behavior recognition module 130 conducts an online behavior detection and classifies the current behavior as normal or abnormal, based on the extracted features, for example, identified features, from the original video stream 150. In accordance with an exemplary embodiment, the extracted features and/or identified features can be body skeleton joint data as shown in FIG. 4.

In accordance with an exemplary embodiment, the offline analysis module 120 provides a user interface for manually enrolling and managing a behavior database. In accordance with an exemplary embodiment, the incremental hierarchy module 140 can be configured to build an abnormal behavior classifiers (or database) by retraining or clustering the updated database to include newly identified normal and/or abnormal behavior and corresponding features and/or identified features of the newly identified normal and/or abnormal behavior, respectively.

In accordance with an exemplary embodiment, the data extracted from the original video stream 150 can be saved in a file and/or can be directly input into the behavior recognition module 130 from the video cameras 152. The video cameras 152 can include, for example, a depth-camera and/or a regular video camera, which can be used as input into behavior recognition module 130. In accordance with an exemplary embodiment, the extracted data from the video stream 150 can be classified using, for example, machine learning algorithms and/or template matching algorithms. For machine learning, according to the identified feature, the behavior can be marked or classified as normal or abnormal behavior. For template matching, the abnormal behavior can be behavior that does not match any normal behavior template. In addition, with template matching, the matching can be based on a single frame and/or alternatively, on multi-frame sequence matching.

In accordance with an exemplary embodiment, the system 100 can be configured to build an incremental hierarchy database in which the system 100 manually enrolls or inputs unknown abnormal behavior. For example, in accordance with an exemplary embodiment, the system 100 can be used as a variable environment human behavior detection system, which can detect abnormal behavior, such as falling down, for purposes of health care detection and prevention.

As shown in FIG. 1, the system 100 includes an online video process module 110, an offline analysis module 120, a behavior recognition module 130, and an incremental database module 140. In accordance with an exemplary embodiment, the online video process module 110 can be used to monitor, capture and extract body skeleton joint data (FIG. 4) from video frames. The offline analysis module 120 saves the captured skeleton frames into files and provides a database management interface for manually initialing and managing a behavior database.

In accordance with an exemplary embodiment, the behavior recognition module 130 can be configured to determine if a human behavior detected in the video stream 150 belongs to a type of behavior or behavior classification by using template matching and/or machine learning. In accordance with an exemplary embodiment, if the human behavior is not classified using the template matching or machine learning, the human behavior can be added to the incremental hierarchy database 140. In accordance with an exemplary embodiment, for example, the captured data from the video stream 150 can be recognized as a new type of abnormal behavior and saved in the database 140.

Figure 2:
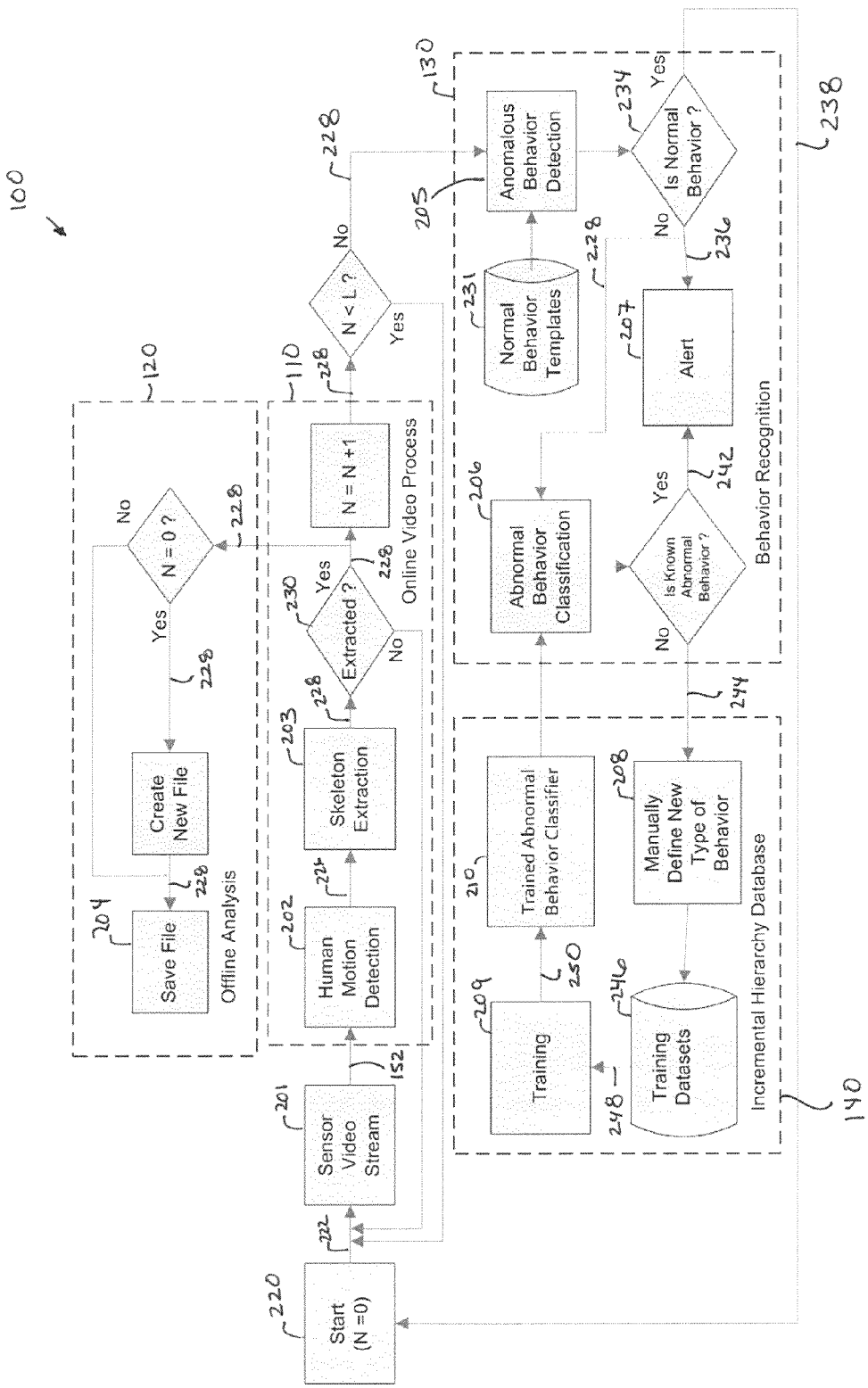
FIG. 2 illustrates a flow chart of the behavior recognition system in accordance with an exemplary embodiment.

FIG. 2 is a flow chart of the behavior recognition system 100 for detecting abnormal behavior in accordance with an exemplary embodiment. As shown in FIG. 2, the system 100 includes a sensor video stream unit 201, which receives a start signal 222 from a start module 220 and generates an original video stream 152. For example, in accordance with an exemplary embodiment, the original video stream 152 can include video RGB (red, green, and blue) images or RGB plus depth images. In accordance with an exemplary embodiment, for example, the input can be the starting signal 222 and the output can be the original video stream 152.

The original video stream 152 can then be forwarded to a human motion detection unit 202 within the online video process module 110. The online video process module 110 can include the human detection unit 202 and a skeleton extraction unit 203. In accordance with an exemplary embodiment, the human motion detection unit 202 can be configured to resize (or revise) the original video stream 152 for video frames, which do not contain human skeleton information. In accordance with an exemplary embodiment, the video frames 152 which do not include human skeleton information are abandoned. In accordance with an exemplary embodiment, for example, the input can be the original video stream 152 and the output can be a revised video stream 226.

The skeleton extraction unit 203 extracts human body skeleton data 228 from the revised video stream 226 and stores the extracted human body skeleton data 228 in memory (e.g., a memory module, which can be manipulated by one or more computer processing units). In accordance with an exemplary embodiment, the system 100 can use a flag 230 to indicate if skeleton data 228 has been successful extracted. According to the extraction flag 230, if the output is skeleton data 228, the skeleton data 228 can be forwarded to the offline analysis module 120 for analysis, if needed. In addition, the skeleton data 228 can be forwarded to the behavior recognition module 130 for analysis. If no skeleton data 228 is extracted, a signal 232 can be returned to the start module 220 of the system 100 indicating that no skeleton data 228 was extracted by the skeleton extraction unit 203.

The offline analysis module 120 can include a save file unit 204, which is configured to store the skeleton data 228 in the form of a new file. The offline analysis module 120 preferably is configured to create a new file for captured skeleton data 228, wherein the corresponding frame (N) has not previously been saved into memory in the offline analysis module 120 (i.e., N=0?). In accordance with an exemplary embodiment, the input can be skeleton data 228 and the output can be a signal that shows if the skeleton data 228 has been successful saved in a file. For example, in accordance with an exemplary embodiment, the offline analysis module 120 can be used to input the captured skeleton data 228 and corresponding frames (N) into one or more files and provide a database.

In accordance with an exemplary embodiment, the skeleton data 228 is then forwarded to an anomalous behavior detection unit 205, which is located within the behavior recognition module 130. The skeleton data 228 is preferably in the form of plurality of frames (N+1), which are passed to the anomalous behavior unit 205 for analysis. In accordance with an exemplary embodiment, the joint data sequence (N+1) can be passed to behavior recognition or detection unit 205 until there is no body skeleton detected or the frames number N stored in memory reaches the length threshold L (N<L), where L is the minimal length of an action.

The anomalous behavior detection unit 205 is configured to determine the presence of normal behavior and/or abnormal behavior by using a machine learning and/or a template matching process (or algorithm) 234. In accordance with an exemplary embodiment, the machine learning and/or the template matching process 234 determines if the skeleton data 228 matches a normal behavior template 231 (e.g., a pattern associated with the skeleton data having a spatial arrangement) within the behavior detection unit 205. If the skeleton data 228 does not match an existing normal behavior template, the behavior recognition module 130 can generate an alert signal 236. If the skeleton data 228 matches an existing normal behavior template, the process 238 returns to the start module 220. In accordance with an exemplary embodiment, the normal behavior template 231 can be any spatial arrangement of skeleton data having an arrangement, which has been previously determined to represent normal behavior.

In accordance with an exemplary embodiment, the method and systems as disclosed herein, in a first stage (or initial stage), the method and systems use the anomalous behavior detection unit 205 to detect the presence of normal behavior versus abnormal behavior based solely on matching the skeleton data 228 to normal behavior templates 231. Thus, the first stage of the behavior recognition module 130 uses a database consisting of normal behavior templates 231, rather than matching the skeleton data 228 to abnormal behavior templates.

In accordance with an exemplary embodiment, if the skeleton data 228 does not match a normal behavior template within the anomalous behavior detection unit 205, the skeleton data 228 can be sent to the abnormal behavior classification unit 206 to determine the type of abnormal behavior using the machine learning and/or template matching process. If the captured behavior data matches none of recorded abnormal behaviors, the abnormal behavior classification unit 206 can generate an unknown behavior signal 244, which can be sent to the manually defined new type of behavior unit 208.

In accordance with an exemplary embodiment, if the abnormal behavior is known, the alert unit 207 receives an alert signal 238 from the anomalous behavior detection unit 205 and/or an unknown behavior signal 242 from the abnormal behavior classification unit 206 and notices the detection of abnormal behavior on behalf of the user or individual within the images received from the sensor and/or video stream 150. In accordance with an exemplary embodiment, the alert unit 207 sends an audible signal and/or visual message to an operator that abnormal behavior has been detected for one or more of the subjects, for example, in the form of a warning message that a subject has fallen.

In accordance with an exemplary embodiment, alternatively, a new type behavior definition unit 208 within the incremental hierarchy database 140 can receive the unknown behavior signal 244 from the abnormal behavior classification unit 206 and can record the detected unrecorded behavior of the user. In accordance with an exemplary embodiment, the system 100 can be configured to provide a graphic user interface (GUI) for enrolling and displaying new behavior. In addition, the unknown behavior signal 244 can be used to update the training data sets and/or databases 246 within the behavior definition unit 208, by enrolling or adding the unrecorded behavior to the training sets and/or databases 246.

In accordance with an exemplary embodiment, the incremental hierarchy database 140 can include a training unit 209, which receives data 248 from the behavior database 246 and outputs behavior models and/or clustered behavior groups 250. The behavior models and/or clustered behavior groups 250 are then input into an abnormal behavior classifier unit 210, which classifies the identified features within the training sets and/or behavior databases 246.

Figure 3:
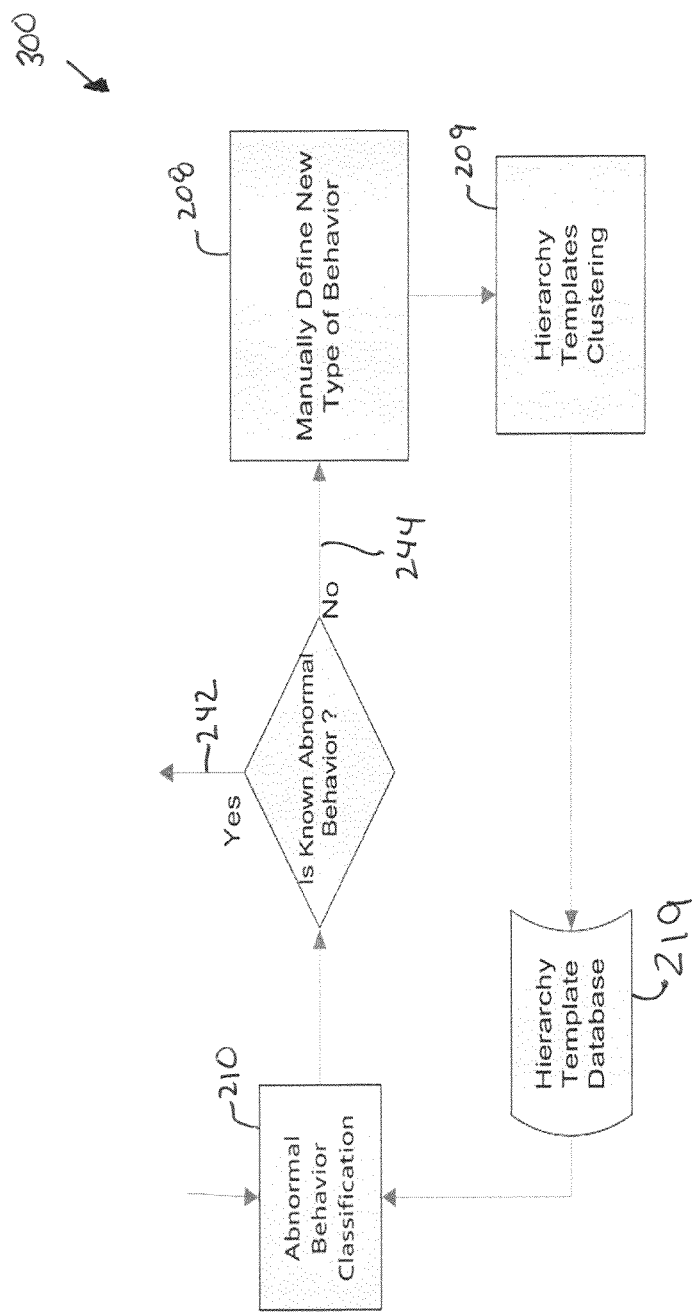
FIG. 3 illustrates a flow chart of an incremental hierarchy template database in accordance with an exemplary embodiment.

FIG. 3 is a flowchart 300 of incremental hierarchy database module 140 using a template matching process, which uses hierarchy templates clustering to replace the training datasets 246 (FIG. 2). As shown in FIG. 3, the hierarchy templates clustering unit 209 clusters the updated templates database, for example, which can be based on a frame sequence geometric distance analysis as disclosed herein. As shown in FIG. 3, for example, if the abnormal behavior is known, an alert 242 can be sent in the form of a message. Alternatively, if the abnormal behavior is not known, the new type of abnormal behavior 242 can be manually defined and a hierarchy template clustering 219 can be performed. In addition, the hierarchy template database 219 can be updated to include the new type of abnormal behavior, which is stored in the abnormal behavior classification database 210.

In accordance with an exemplary embodiment, this disclosure can be applicable to various abnormal behaviors detection by extracting multiple various features or enrolling multi-templates. For example, in accordance with an exemplary embodiment, the present disclosure can be configured for use with a 3D (three-dimensional) depth camera and video camera as a capturing sensor, and, if a 3D (3-dimensional) depth camera is used, the captured frame can contain human body skeleton joints position data.

FIG. 4 illustrates skeleton representation 400 for an exemplary user facing the sensor and/or video camera wherein the skeleton consists of 15 joints and 11 line segments representing head, shoulders and limbs of human body. As shown in FIG. 4, the line segments are mutually connected by joints and the movement of one segment is constrained by other. Furthermore, a few of the parts or line segments can perform the independent motion while the others may stay relatively stationary, for example, such as a head movement. In accordance with an exemplary embodiment, the upper torso or center point of the chest, reference point 9 on FIG. 4 can be used as a base or reference point for the methods and processes as described herein.

FIG. 5 shows the spherical coordinate system 500 that can be used to measure the movement of a joint in three-dimension (3D) space. In accordance with an exemplary embodiment, the position of a line segment in 3D space is determined by the two joints.

For example, for a 3D skeleton frame, 15 body skeleton joints data can be extracted, which can be used to simulate the movement of human body. The joints data sequence will be passed to the behavior recognition module 130 until there is no body skeleton detected or the frames number N stored in memory reaches the length threshold L. In accordance with an exemplary embodiment, the system 100 can be configure to save each frame to the data file unit 204, which can be analyzed and/or studied on an as needed basis in the offline analysis module 120.

In accordance with an exemplary embodiment, the offline analysis module 120 can be configured such that human supervision can optionally be employed to ensure the accuracy of the models, including adding and/or deleting templates based on reviewing results, which can be designed to guarantee the incremental adding and/or deleting of templates to the template database. In accordance with an exemplary embodiment, the template matching method includes a database having initially standard normal behavior template data, which is then incrementally modified to include abnormal behavior template data.

In accordance with an exemplary embodiment, the system 100 categorizes the template behavior database as normal behavior and abnormal behavior. For example, normal behavior can be defined as a regular situation without triggering the reaction of system. In accordance with an exemplary embodiment, the abnormal data stored can be manually enrolled (or entered) by an operator (or user) into the template database, which would be considered as new abnormal behavior. In addition, depending on the application, the template database can include one or more sets of "normal" behavior datasets and one or more "abnormal" behavior datasets depending on use, settings, and/or subjects.

In accordance with an exemplary embodiment, the system 100 can be configured to implement several methods for behavior recognition. For example, in accordance with an exemplary embodiment, the system 100 can use a machine learning module (or process), such as a Dynamic Time Wrapping algorithm as a template matching method by which the minimum geometric distance between capture data and template data can be found.

In accordance with an exemplary embodiment, the machine learning method preferably includes extensive or large data to build the behavior model. For example, when the database size is small, the system 100 adopts template matching to recognize behavior. Accordingly, in accordance with an exemplary embodiment, for example, the system 100 can start to recognize behavior as soon as human motion is detected. In addition, since the probability of normal behavior is much higher than abnormal behavior, the system 100 can be configured to separate the normal behavior detection function and abnormal behavior detection function as different units which can reduce the matching times and corresponding processing times.

In accordance with an exemplary embodiment, for the dynamic time wrapping matching method, based on enrolled behavior templates, the system 100 can be configured to find the similarity of input data and each template by calculating the geometric distance between the input data (or captured data) and the template data. The equation of geometric distance between template data and captured data:

$$D = \sum_{t=1:T} \sum_{j \in J} \sqrt{(x_i^j - x_c^j)^2 + (y_i^j - y_c^j)^2 + (z_i^j - z_c^j)^2}$$

where T is the length of sequence; $(x_i^j, y_i^j, z_i^j)$ is the position of joint j from input skeleton data, $(x_c^j, y_c^j, z_c^j)$ is the position of joint j from template data and J is the number of joints in skeleton.

In accordance with an exemplary embodiment, the template matching method normalizes the template data and captured data by translating the joint position to make the matching more accurate, wherein $$p'_i = p_i - p_a$$

where $p_i = (x_i, y_i, z_i)$ and $p_a = (x_a, y_a, z_a)$, translate all the joints coordinating with the abdomen joint, which is set as original point $p_a$.

All the link vectors between joints with angle A are rotated, wherein:

$$A = \arccos\left(\frac{Vt \cdot Vc}{|Vt| * |Vc|}\right).$$

where Vt is the normal of the plane formed by three joints, i.e., joint 5, 6, and 9.

For machine learning, the system 100 differentiates itself from its counterpart by using a multiple application-oriented feature, and wherein according to 3D skeleton data, the behavior can be classified into two groups: abnormal and normal.

In accordance with an exemplary embodiment, the system 100 can be configured to construct an incremental hierarchy database 140 which can be divided as a normal templates data set (or database) 142 and an abnormal templates data set (database) 144. For example, for the template matching method, the system 100 can use a Dendrogram which is a tree-like structure to group templates for reducing abnormal behavior matching times. In accordance with an exemplary embodiment, the database 140 can be initialized by normal templates. When unknown behavior is captured and enrolled, the system 100 clusters updated abnormal behavior templates database 144 and rebuilds the Dendrogram tree. For machine learning, the system 100 can be configured to update the behavioral database 140, if a new abnormal behavior type is identified or defined.

In accordance with an exemplary embodiment, a non-transitory computer readable medium containing a computer program having computer readable code embodied therein for recognition of abnormal behavior is disclosed, which comprises: capturing at least one video stream of data on one or more subjects; extracting body skeleton data from the at least one video stream of data; classifying the extracted body skeleton data as normal behavior or abnormal behavior; and generating an alert, if the extracted skeleton data is classified as abnormal behavior.

The non-transitory computer usable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

The method and system for abnormal behavior recognition as disclosed herein may be implemented using hardware, software or a combination thereof. In addition the method and system for abnormal behavior recognition as disclosed herein may be implemented in one or more computer systems or other processing systems, or partially performed in processing systems such as personal digit assistants (PDAs). In yet another embodiment, the invention is implemented using a combination of both hardware and software.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for recognizing abnormal behavior, the method comprising:
capturing at least one video stream of data on one or more subjects;
extracting body skeleton data from the at least one video stream of data;
classifying the extracted body skeleton data as normal behavior or abnormal behavior;
generating an unknown behavior signal, if the abnormal behavior is a new type of abnormal behavior;
providing the new type of abnormal behavior to an offline analysis module and manually enrolling the new type of abnormal behavior into an incremental hierarchy template database; and
generating an alert, if the abnormal behavior is a known type of abnormal behavior.

2. The method of claim 1, comprising:
revising the at least one video stream of data to delete video frames, which do not contain human body skeleton information; and
extracting the body skeleton data from the revised sensor video stream data.

3. The method of claim 1, wherein the step of classifying the extracted body skeleton data comprises:
  generating the alert, if the extracted skeleton data does not match a template of normal behavior; and
  classifying the extracted skeleton data as the abnormal behavior.

4. The method of claim 1, comprising:
  determining the abnormal behavior using the incremental hierarchy template database, wherein the abnormal behavior is human skeleton data that does not match a normal behavior template within the incremental hierarchy template database.

5. The method of claim 4, wherein the normal behavior template is a spatial arrangement of skeleton data having an arrangement, which has been previously determined to represent normal behavior.

6. The method of claim 1, comprising:
  recognizing normal or abnormal behavior according to an identified feature, the identified feature comprising at least one frame from the video stream of data; and
  classifying the human skeleton data as the normal or abnormal behavior based on the identified feature.

7. The method of claim 6, wherein the identified feature comprises a multi-frame sequence.

8. The method of claim 1, comprising:
  generating the incremental template hierarchy database based on data clustering using Dendrogram cluster analysis.

9. A system for recognition of abnormal behavior, the system comprising:
  an online process module configured to extract body skeleton data from at least one video stream of data;
  a behavior recognition module configured to classify a current behavior shown in the at least one video stream of data as abnormal behavior or normal behavior based on the extracted body skeleton data from the at least one video stream of data, the behavior recognition module configured to generate an unknown behavior signal, if the abnormal behavior is a new type of abnormal behavior; and
  an offline analysis module configured to provide a user interface for manually enrolling the new type of abnormal behavior and managing the incremental hierarchy template database of the abnormal and normal behaviors, wherein the abnormal behavior consists of the new type of abnormal behavior and known abnormal behavior.

10. The system of claim 9, wherein the behavior recognition module is configured to determine the abnormal behavior using the incremental hierarchy template database, wherein the abnormal behavior is human skeleton data that does not match a normal behavior template within the incremental hierarchy template database.

11. The system of claim 9, wherein the incremental hierarchy template database configured to build an abnormal behavior classifier by retraining or clustering an updated incremental hierarchy template database with the abnormal and normal behaviors detected in the sensor video stream of data.

12. The system of claim 9, wherein the behavior recognition module classifies the current behavior based on the extracted body skeleton data using a template matching system, wherein the extracted body skeleton data is matched to abnormal behavior templates or normal behavior templates, and if the extracted body skeleton data does not match either a normal or abnormal behavior template, the extracted body skeleton data is classified as the new type of abnormal behavior, which is manually enrolled into the incremental hierarchy template database.

13. The system of claim 9, wherein the at least one video stream is captured using one or more sensor and/or 3-dimensional video cameras.

14. A system for recognition of abnormal behavior, the system comprising:
  a video camera configured to capture at least one video stream of data on one or more subjects; and
  one or more modules having executable instructions for:
    extracting body skeleton data from the at least one video stream of data;
    classifying the extracted body skeleton data as normal behavior or abnormal behavior;
    generating an unknown behavior signal, if the abnormal behavior is a new type of abnormal behavior;
    providing the new type of abnormal behavior to an offline analysis module and manually enrolling the new type of abnormal behavior into the incremental hierarchy template database; and
    generating an alert, if the abnormal behavior is a known type of abnormal behavior.

15. The system of claim 14, comprising:
  revising the at least one video stream of data to delete video frames, which do not contain human body skeleton information; and
  extracting the body skeleton data from the revised sensor video stream data.

16. A non-transitory computer readable medium containing a computer program having computer readable code embodied therein for recognition of abnormal behavior, comprising:
  capturing at least one video stream of data on one or more subjects;
  extracting body skeleton data from the at least one video stream of data;
  classifying the extracted body skeleton data as normal behavior or abnormal behavior;
  generating an unknown behavior signal, if the abnormal behavior is a new type of abnormal behavior;
  providing the new type of abnormal behavior to an offline analysis module and manually enrolling the new type of abnormal behavior into the incremental hierarchy template database; and
  generating an alert, if the abnormal behavior is a known type of abnormal behavior.

17. The computer readable medium of claim 16, comprising:
  revising the at least one video stream of data to delete video frames, which do not contain human body skeleton information; and
  extracting the body skeleton data from the revised sensor video stream data.

* * * * *